(12) United States Patent
Zhu et al.

(10) Patent No.: US 11,337,237 B2
(45) Date of Patent: May 17, 2022

(54) METHODS AND DEVICES FOR TRANSMITTING/RECEIVING SCHEDULING COMMANDS

(71) Applicant: Telefonaktiebolaget LM Ericsson (publ), Stockholm (SE)

(72) Inventors: Huaisong Zhu, Beijing (CN); Qianxi Lu, Beijing (CN); Zhan Zhang, Beijing (CN); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/463,491

(22) PCT Filed: Nov. 23, 2017

(86) PCT No.: PCT/CN2017/112596
§ 371 (c)(1),
(2) Date: May 23, 2019

(87) PCT Pub. No.: WO2018/095365
PCT Pub. Date: May 31, 2018

(65) Prior Publication Data
US 2019/0364587 A1 Nov. 28, 2019

(30) Foreign Application Priority Data
Nov. 25, 2016 (WO) ................ PCT/CN2016/107296

(51) Int. Cl.
*H04W 72/12* (2009.01)
*H04W 4/70* (2018.01)
(Continued)

(52) U.S. Cl.
CPC ......... *H04W 72/1273* (2013.01); *H04L 1/189* (2013.01); *H04W 4/70* (2018.02); *H04W 72/0446* (2013.01); *H04W 72/1257* (2013.01)

(58) Field of Classification Search
CPC ................................................ H04W 72/1273
See application file for complete search history.

(56) References Cited

U.S. PATENT DOCUMENTS

| 2009/0219841 A1* | 9/2009 | Sudarshan | ............ H04L 5/0007 370/281 |
| 2011/0243012 A1* | 10/2011 | Luo | ....................... H04L 5/0055 370/252 |

(Continued)

FOREIGN PATENT DOCUMENTS

WO    2015 129797 A1    9/2015

OTHER PUBLICATIONS

3GPP TSG-RAN WG1 #85; Nanjing, China; Source: Qualcomm Incorporated; Title: Summary of email discussion on frame structure (R1-164696)—May 23-27, 2016.
(Continued)

*Primary Examiner* — Chi H Pham
*Assistant Examiner* — Raul Rivas
(74) *Attorney, Agent, or Firm* — Baker Botts, LLP

(57) ABSTRACT

The present disclosure provides a method (200) in an access device for transmitting scheduling commands. The method (200) includes: transmitting (210) a scheduling command for scheduling a downlink data transmission in a first subframe where the downlink data transmission occurs; and transmitting (220) a replica of the scheduling command in each of one or more further subframes different from the first subframe.

20 Claims, 6 Drawing Sheets

(51) Int. Cl.
*H04L 1/18* (2006.01)
*H04W 72/04* (2009.01)

(56) References Cited

U.S. PATENT DOCUMENTS

| 2013/0044652 | A1 | 2/2013 | Wang et al. |
| 2015/0092645 | A1* | 4/2015 | Tabet ............... H04L 1/1854 370/311 |
| 2016/0242150 | A1 | 8/2016 | Kang et al. |
| 2017/0013615 | A1* | 1/2017 | Suzuki .............. H04L 1/08 |
| 2018/0199341 | A1* | 7/2018 | Baldemair ........... H04L 5/0091 |

OTHER PUBLICATIONS

Extended European Search Report issued for Application No./Patent No. 17874891.9-1215 / 3527023 PCT/CN2017112596—May 4, 2020.

3GPP TSG RAN WG1 Meeting #87; Reno, USA; Source: ZTE, ZTE Microelectronics; Title: Considerations on design aspects for NR URLIC (R1-1611294)—Nov. 14-18, 2016.

3GPP TSG-RAN WG1 #87; Reno, USA; Source: Nokia, Alcatel-Lucent Shanghai Bell; Title: Enhanced semi-persistent scheduling for 5G URLLC (R1-1612251)—Nov. 14-18, 2616.

3GPP TSG RAN WG1 Meeting #86bis; Lisbon, Portugal; Source: intel Corporation; Title: On HARQ support for URLLC (R1-1609543)—Oct. 10-14, 2016.

PCT International Search Report for International application No. PCT/CN2017/112596—dated Feb. 23, 2018.

PCT Written Opinion of the International Searching Authority for International application No. PCT/CN2017/112596—dated Feb. 23, 2018.

Examination Report issued by Intellectual Property India for Application No. 201917016100—Nov. 11, 2020.

Hearing Notice issued by Intellectual Property India for Application No. 201917016100—Sep. 9, 2021.

* cited by examiner

METHODS AND DEVICES FOR TRANSMITTING/RECEIVING SCHEDULING COMMANDS

PRIORITY

This nonprovisional application is a U.S. National Stage Filing under 35 U.S.C. § 371 of International Patent Application Serial No. PCT/CN2017/112596 filed Nov. 23, 2017 and entitled "Methods and Devices for Transmitting/Receiving Scheduling Commands" which claims priority to International Patent Application No. PCT/CN2016/107296 filed Nov. 25, 2016 both of which are hereby incorporated by reference in their entirety.

TECHNICAL FIELD

The present disclosure relates to communication technology, and more particularly, to methods and devices for transmitting/receiving scheduling commands.

BACKGROUND

Ultra-Reliable and Low-Latency Communications (URLLC) is a category of services defined in 3GPP TR 22.862, Version 14.1.0. For URLLC services, both high reliability and low latency are required. However, these requirements are mutually conflicting and are typically traded off against each other, which brings a remarkable challenge to user-plane (UP) design.

According to 3GPP TR 22.862, the latency requirement for URLLC services ranges from 1 ms to 10 ms for various applications including automation applications, smart grids and intelligent transportation. The reliability requirement for URLLC services ranges from a residual error rate of $10^{-4}$ to $10^{-6}$, or even to $10^{-9}$. It is to be noted here that in calculating the residual error rate, packets arriving later than the required latency bound, such as 1 ms or 10 ms, will be regarded as errors in the context of URLLC.

Simultaneously achieving such high requirements on both reliability and latency may affect several layers and components in both Radio Access Network (RAN) and Core Network (CN). The URLLC can be considered as an extremely high QoS use case for both RAN and CN.

In Long Term Evolution (LTE), Physical Downlink Control Channel (PDCCH) or enhanced PDCCH (ePDCCH) is used to signal downlink scheduling assignments in Physical Downlink Shared Channel (PDSCH) and uplink scheduling grants. Each PDCCH or ePDCCH may carry signaling for one or more terminal devices, also referred to as User Equipments (UEs).

The reliability of PDCCH is required to be higher than that of traffic channels, such as PDSCH, since the assignment of physical resource blocks for PDSCH is derived from successful demodulation of PDCCH. In 3GPP, the Block Error Rate (BLER) of PDCCH is required to be no higher than $10^{-3}$ for Mobile Broad Band (MBB) traffic.

In URLLC design related discussions in 3GPP, one focus relates to how to improve robustness of downlink scheduling commands that are carried in control channels, e.g., PDCCH and/or ePDCCH.

In 3GPP RAN1 #86bis meeting, a detailed analysis about robustness of uplink dynamic scheduling and downlink dynamic scheduling is described in Intel contribution R1-1609543, which is available at http://www.3gpp.org/ftp/TSG_RAN/WG1_RL1/TSGR1_86b/Docs/R1-1609543.zip. The key conclusion is that the control channel reliability should exceed the required reliability in all dynamic scheduling scenarios. Thus, to meet the requirements on data channels, e.g., BLER no higher than $10^{-6}$ for URLLC, the BLER of the downlink control channel should not be higher than $10^{-6}$. However, given the current channel design in LTE, the BLER is difficult to meet the requirement of $10^{-6}$ with the target Signal to Noise Ratio (SNR), even with the highest physical channel resources consumption.

FIG. 1 shows an example of scheduling command transmission in LTE. FIG. 1 shows three subframes, SF #1, SF #2 and SF #3. Each subframe can be flexibly configured for transmission of downlink (DL) and/or uplink (UL) traffic. The downlink transmission and the uplink transmission are separated by a guard period (labeled as "G"). The first one or more symbols in each subframe (labeled as "R") are reserved for control information transmission, such as PDCCH. The resources for DL data can also be used to carry control information, such as ePDCCH.

As shown in FIG. 1, it is assumed that a DL data packet arrives at an access device (e.g., an evolved NodeB, or eNB) at time t0. After processing at the physical channel (e.g., channel coding, modulation and generation of a scheduling command for this packet), the packet is ready to be transmitted at time t1. However, there may not be enough time for transmission of this packet in SF #1. Then, the eNB will store the scheduling command and the data packet, waiting for the next opportunity for DL data transmission. Since SF #2 has no resources for DL traffic, the eNB transmits the data packet in SF #3 (in the hatched region). As shown, the scheduling command for the data packet can be transmitted in the resources reserved for control information transmission (PDCCH) and/or in the resources for DL traffic transmission (ePDCCH) in SF #3.

However, if the UE fails to receive the scheduling command, it would be unable to receive the data packet correctly. In this case, the eNB may retransmit the data packet and an associated scheduling command to the UE after expiry of a timer. As a result, the latency and the BLER of the data traffic will be increased, which may be intolerable for a URLLC service.

There is thus a need for an improved solution for transmission of scheduling commands.

SUMMARY

It is an object of the present disclosure to provide methods and devices for transmitting/receiving scheduling commands, capable of improving robustness of scheduling command transmission, thereby achieving low latency and high reliability.

According to a first aspect of the present disclosure, a method in an access device for transmitting scheduling commands is provided. The method includes: transmitting a scheduling command for scheduling a downlink data transmission in a first subframe where the downlink data transmission occurs; and transmitting a replica of the scheduling command in each of one or more further subframes different from the first subframe.

In an embodiment, the operation of transmitting the replica of the scheduling command includes: transmitting the replica of the scheduling command in reserved resources and/or resources for downlink data traffic in each of one or more further subframes before the first subframe.

In an embodiment, the replica includes an indication of the first subframe.

In an embodiment, the indication indicates an offset between the subframe in which the replica is transmitted and the first subframe.

In an embodiment, the operation of transmitting the scheduling command in the first subframe or transmitting the replica of the scheduling command in each of the one or more further subframes includes: transmitting the scheduling command or the replica of the scheduling command in a numerology having the longest duration and the smallest bandwidth among numerologies in the first subframe or in the further subframe.

In an embodiment, the numerology is associated with Machine Type Communication (MTC) resources.

In an embodiment, the downlink data transmission is scheduled semi-persistently and starts in the first subframe, and the operation of transmitting the replica of the scheduling command includes: transmitting the replica of the scheduling command in each of one or more further subframes subsequent to the first subframe and carrying the semi-persistently scheduled downlink data transmission.

In an embodiment, the replica includes an indication of the start of the downlink data transmission in the first subframe.

In an embodiment, the downlink data transmission is associated with Ultra-Reliable and Low-Latency Communications (URLLC).

According to a second aspect of the present disclosure, an access device is provided. The access device includes a transceiver, a processor and a memory. The memory includes instructions executable by the processor whereby the access device is operative to perform the method according to the above first aspect.

According to a third aspect of the present disclosure, a computer readable storage medium is provided. The computer readable storage medium has computer program instructions stored thereon. The computer program instructions, when executed by a processor in an access device, cause the access device to perform the method according to the above first aspect.

According to a fourth aspect of the present disclosure, a method in a terminal device for receiving scheduling commands is provided. The method includes: receiving a scheduling command for scheduling a downlink data transmission in a first subframe where the downlink data transmission occurs; and receiving a replica of the scheduling command in each of one or more further subframes different from the first subframe.

In an embodiment, the operation of receiving the replica of the scheduling command includes: receiving the replica of the scheduling command in reserved resources and/or resources for downlink data traffic in each of one or more further subframes before the first subframe.

In an embodiment, the replica includes an indication of the first subframe.

In an embodiment, the indication indicates an offset between the subframe in which the replica is transmitted and the first subframe.

In an embodiment, the operation of receiving the scheduling command in the first subframe or receiving the replica of the scheduling command in each of the one or more further subframes includes: receiving the scheduling command or the replica of the scheduling command in a numerology having the longest duration and the smallest bandwidth among numerologies in the first subframe or in the further subframe.

In an embodiment, the numerology is associated with Machine Type Communication (MTC) resources.

In an embodiment, the downlink data transmission is scheduled semi-persistently and starts in the first subframe, and the operation of receiving the replica of the scheduling command includes: receiving the replica of the scheduling command in each of one or more further subframes subsequent to the first subframe and carrying the semi-persistently scheduled downlink data transmission.

In an embodiment, the replica includes an indication of the start of the downlink data transmission in the first subframe.

In an embodiment, the method further includes: buffering the downlink data transmission in the first subframe and each of the one or more further subframes.

In an embodiment, the method further includes: maintaining a monitor window in which the terminal device continuously monitors the scheduling command or the replica thereof.

In an embodiment, a sliding window is used as the monitor window to avoid having more than one scheduling command in the monitor window.

In an embodiment, the method further includes: combining the received scheduling command and the replica(s) thereof.

In an embodiment, the downlink data transmission is associated with Ultra-Reliable and Low-Latency Communications (URLLC).

According to a fifth aspect of the present disclosure, a terminal device is provided. The terminal device includes a transceiver, a processor and a memory. The memory includes instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the embodiments of the present disclosure, a scheduling command for scheduling a downlink data transmission can be transmitted in one or more subframes in addition to the subframe used for the downlink data transmission. In this way, a plurality of replicas of the scheduling commands can be combined at a receiving terminal device, such that a diversity gain can be achieved. Accordingly, the robustness of the scheduling command can be improved, thereby achieving low latency and high reliability.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be appreciated that the following embodiments are illustrative only, rather than limiting the scope of the disclosure.

Figure 2:
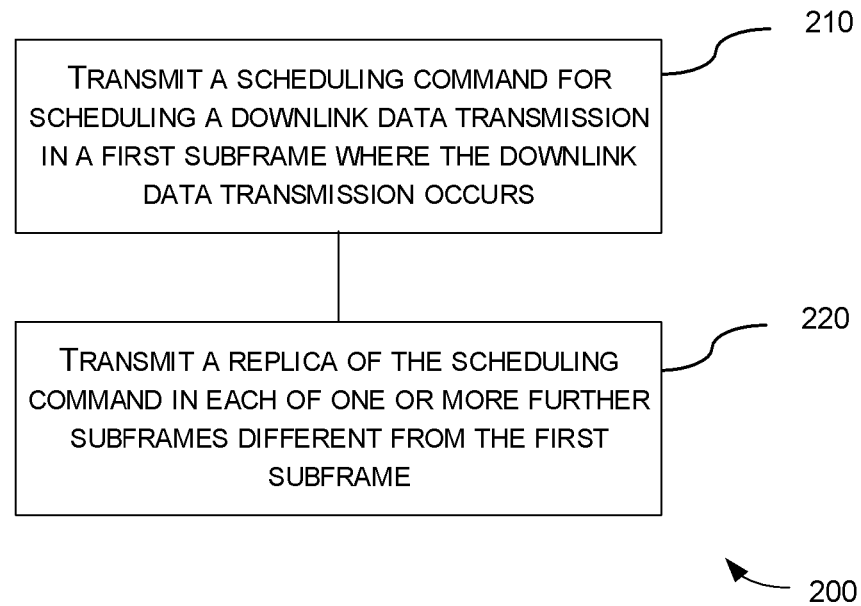
FIG. 2 is a flowchart illustrating a method for transmitting scheduling commands according to an embodiment of the present disclosure.

FIG. 2 is a flowchart illustrating a method 200 for transmitting scheduling commands according to an embodiment of the present disclosure. The method 200 can be performed at an access device, such as an eNB.

At block 210, a scheduling command for scheduling a downlink data transmission is transmitted in a first subframe where the downlink data transmission occurs. Here, the downlink data transmission can be associated with Ultra-Reliable and Low-Latency Communications (URLLC).

At block 220, a replica of the scheduling command is transmitted in each of one or more further subframes different from the first subframe.

It is to be noted here that the blocks 210 and 220 are not necessarily performed in the order in which they are described. Rather, the block 210 can be performed before, after or concurrently with the block 220.

The method 200 will be further explained with references to the following examples.

In an example, in the block 220, the replica of the scheduling command can be transmitted in reserved resources and/or resources for downlink data traffic in each of one or more further subframes before the first subframe. The replica can include an indication of the first subframe. The indication can indicate an offset between the subframe in which the replica is transmitted and the first subframe.

Figure 1:
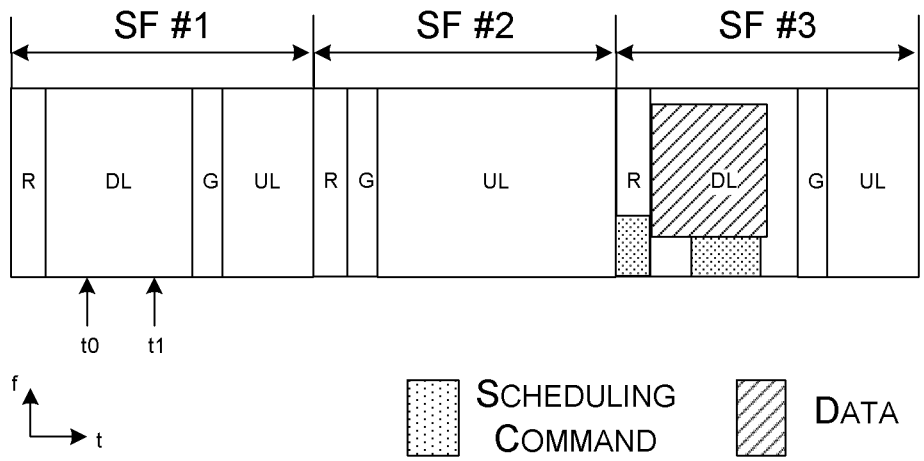
FIG. 1 is a schematic diagram showing an example of scheduling command transmission in LTE.
Figure 3:
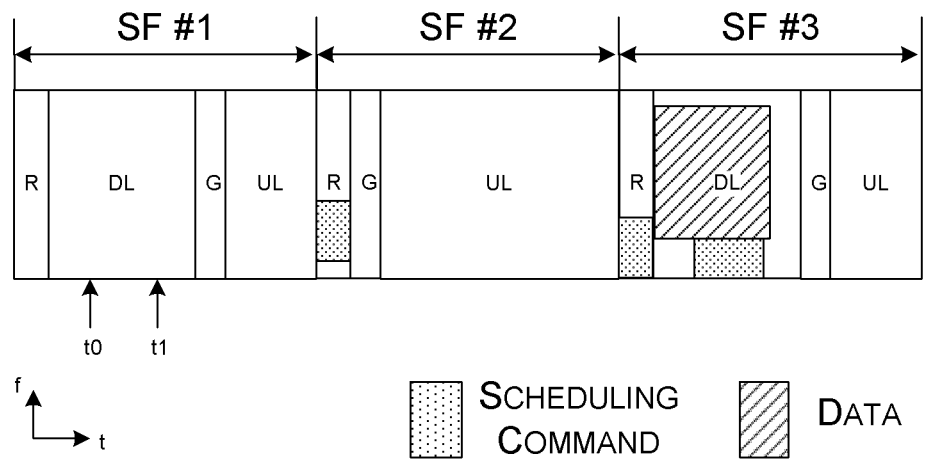
FIG. 3 is a schematic diagram showing an example of scheduling command transmission according to an embodiment of the present disclosure.

FIG. 3 is a schematic diagram showing an example of scheduling command transmission according to an embodiment of the present disclosure. Like FIG. 1, it is also assumed that a DL data packet arrives at the access device at time t0 and is ready to be transmitted at time t1. The eNB transmits the data packet in SF #3 (in the hatched region) and the scheduling command for the data packet in the resources reserved for control information transmission and/or in the resources for DL traffic transmission in SF #3.

In addition to the scheduling command(s) transmitted in the subframe used for transmitting the data packet, the access device can also transmit the scheduling command as soon as possible, without having to wait for the subframe used for transmitting the data packet. For example, the scheduling command can also be transmitted in the reserved resources in one or more subframes before the subframe used for transmitting the data packet. As shown in FIG. 3, a replica of the scheduling command can be transmitted in the reserved resources in SF #2, even if this subframe has no resources for DL data.

The replica of the scheduling command transmitted in the reserved resources in SF #2 provides an additional diversity gain for the receiving terminal device to successfully decode the scheduling command. Further, an indication of the subframe containing the data to be scheduled by the scheduling command can be included in the replica. For example, some extra bits in the Downlink Control Indicator (DCI) in the replica of the scheduling command to indicate an offset between the subframe carrying the replica and the subframe carrying the data.

Figure 4:
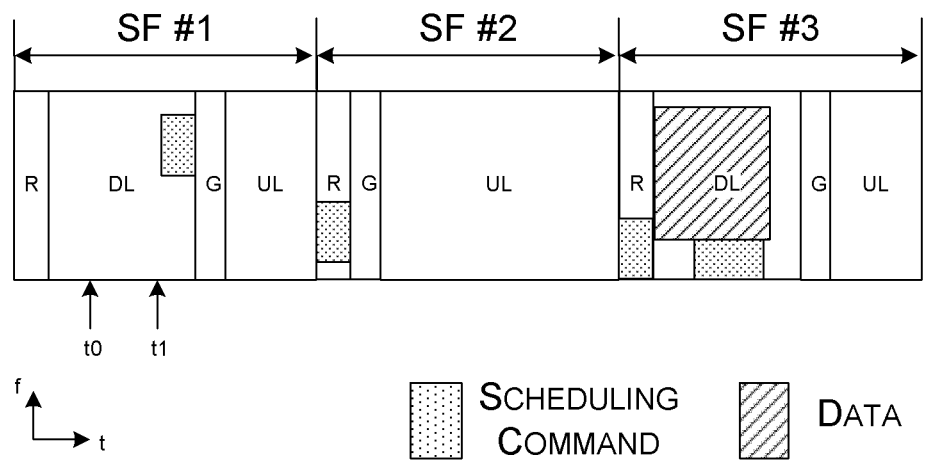
FIG. 4 is a schematic diagram showing another example of scheduling command transmission according to an embodiment of the present disclosure.

FIG. 4 is a schematic diagram showing another example of scheduling command transmission according to an embodiment of the present disclosure. FIG. 4 shows a variant of the example in FIG. 3. In addition to the replica transmitted in the reserved resources in SF #2, if at the time t1 there is still sufficient resources in SF #1 for transmitting the scheduling command, a further replica of the scheduling command can also be transmitted in the resources for DL data in SF #1. In doing so, the access device can insert the replica of the scheduling command by puncturing some data traffic with low priority, such as enhanced MBB (eMBB). As in FIG. 3, an indication of the subframe containing the data to be scheduled by the scheduling command can also be included in the replica transmitted in SF #1.

In an example, in the block 210, the scheduling command can be transmitted in a numerology having the longest duration and the smallest bandwidth among numerologies in the first subframe. Similarly, in the block 220, the replica of the scheduling command can be transmitted in a numerology having the longest duration and the smallest bandwidth among numerologies in the further subframe. Here, the numerology can be a numerology associated with Machine Type Communication (MTC) resources.

Figure 5:
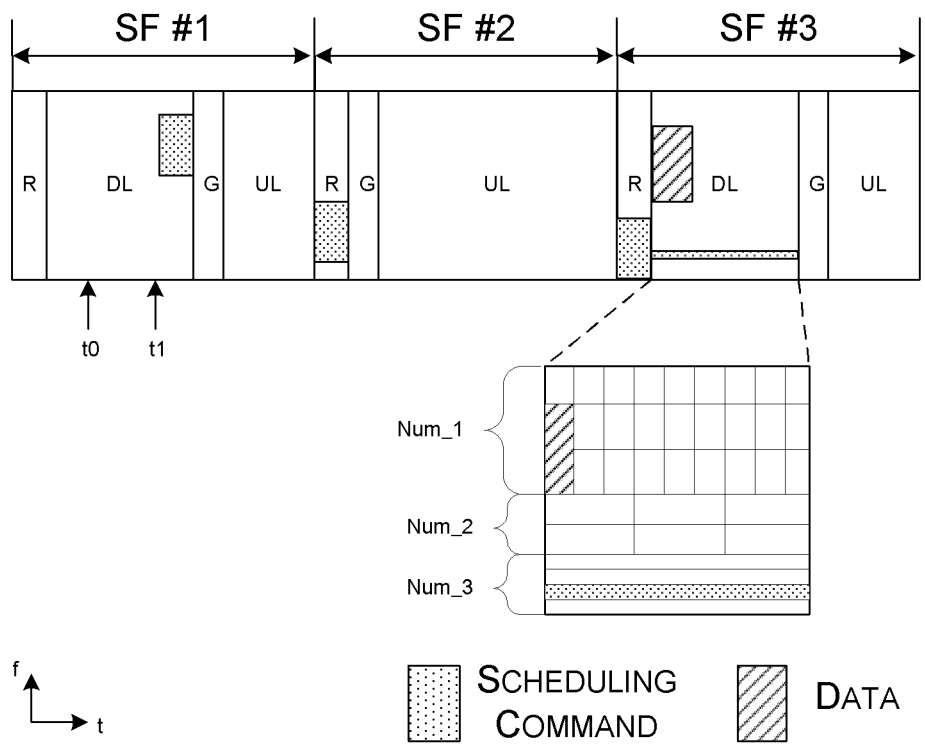
FIG. 5 is a schematic diagram showing yet another example of scheduling command transmission according to an embodiment of the present disclosure.

FIG. 5 is a schematic diagram showing yet another example of scheduling command transmission according to an embodiment of the present disclosure. FIG. 5 shows another variant of the example in FIG. 3.

A set of numerologies will be supported in the next generation system for supporting various services and/or scenarios such as URLLC, eMMB and Machine Type Communications (MTC). These numerologies may have different subframe structures. In FIG. 5, Num_1, Num_2 and Num_3 represent numerologies for URLLC, eMMB and MTC, respectively. FIG. 5 shows an enlarged graph of the DL data region in SF #3. Each grid in the graph represents a scheduling element. As shown, a scheduling element for URLLC has the shortest duration but the largest bandwidth, while a scheduling element for MTC has the longest duration but the smallest bandwidth.

In the example shown in FIG. 5, a replica of the scheduling command for URLLC data can be transmitted in MTC resources. In a power-limited scenario, different numerologies can efficiently increase the robustness of the scheduling command. Such power-limited scenario may occur in many different situations, e.g., when a large amount of URLLC traffic simultaneously occurs at a cell edge or when the access device is a pico or micro base station. In such power-limited scenario, the robustness of URLLC cannot be improved by allocating more frequency resources. Rather, the access device, given a total transmission power (for a particular receiving terminal device) in a narrower bandwidth but with longer transmission time, can increase robustness of URLLC.

In an example, the downlink data transmission may be scheduled semi-persistently and start in the first subframe. In the block 220, the replica of the scheduling command can be transmitted in each of one or more further subframes subsequent to the first subframe and carrying the semi-persistently scheduled downlink data transmission. In this case, the replica can include an indication of the start of the downlink data transmission in the first subframe.

Figure 6:
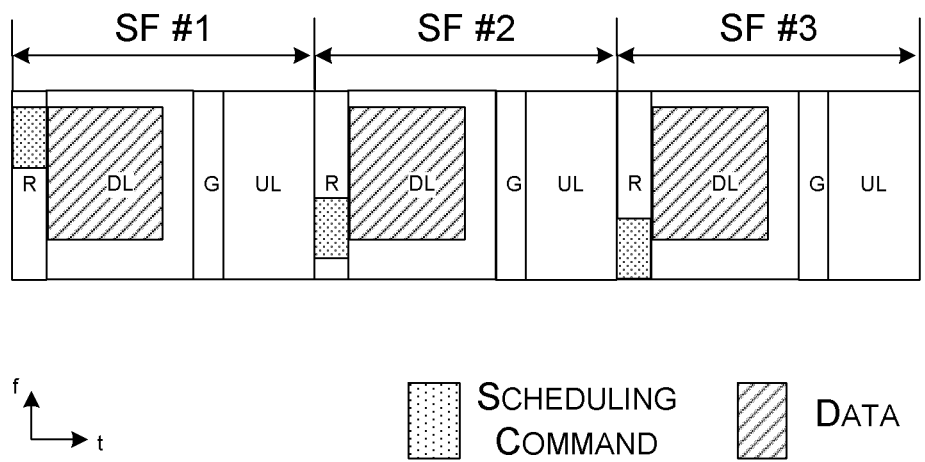
FIG. 6 is a schematic diagram showing yet another example of scheduling command transmission according to an embodiment of the present disclosure.

FIG. 6 is a schematic diagram showing yet another example of scheduling command transmission according to an embodiment of the present disclosure. In this example, a Semi-Persistent Scheduling (SPS) is assumed. In LTE, the eNB only performs SPS for the first transmission (i.e., the scheduling command in the reserved resources in SF #1 in FIG. 6) and the timing for the subsequent transmissions is semi-static.

However, in the example shown in FIG. 6, replicas of the scheduling commands can be transmitted in SF #2 and SF #3. These replicas also indicate the start of the data transmission in SF #1 and provide additional diversity gain for the receiving terminal device to successfully decode the scheduling command.

Figure 7:
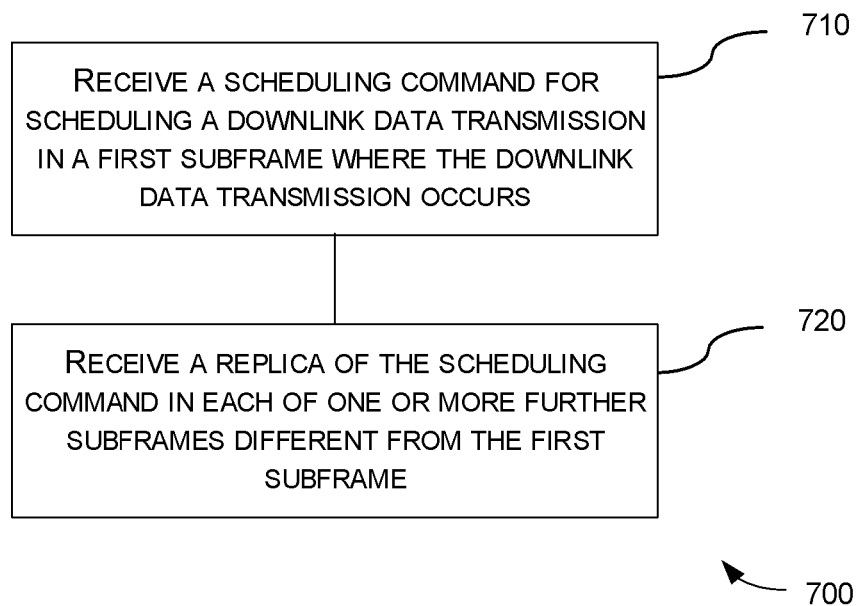
FIG. 7 is a flowchart illustrating a method for receiving scheduling commands according to an embodiment of the present disclosure.

FIG. 7 is a flowchart illustrating a method 700 for receiving scheduling commands according to an embodiment of the present disclosure. The method 700 can be performed at a terminal device, e.g., a UE.

At step 710, a scheduling command for scheduling a downlink data transmission is received in a first subframe where the downlink data transmission occurs. Here, the downlink data transmission can be associated with Ultra-Reliable and Low-Latency Communications (URLLC).

In block 720, a replica of the scheduling command is received in each of one or more further subframes different from the first subframe.

The above examples described in connection with FIGS. 3-6 also apply to the method 700.

In particular, as described above in connection with FIGS. 3-4, in the block 720, the replica of the scheduling command can be received in reserved resources and/or resources for downlink data traffic in each of one or more further subframes before the first subframe. Thee replica can include an indication of the first subframe. The indication can indicate an offset between the subframe in which the replica is transmitted and the first subframe.

As described above in connection with FIG. 5, in the block 710, the scheduling command can be received in a numerology having the longest duration and the smallest bandwidth among numerologies in the first subframe. Additionally or alternatively, in the block 720, the replica of the scheduling command can be received in a numerology having the longest duration and the smallest bandwidth among numerologies or in the further subframe. Here, the numerology can be e.g., a numerology associated with Machine Type Communication (MTC) resources.

As described above in connection with FIG. 6, the downlink data transmission can be scheduled semi-persistently and start in the first subframe. In the block 720, the replica of the scheduling command can be received in each of one or more further subframes subsequent to the first subframe and carrying the semi-persistently scheduled downlink data transmission. In this case, the replica can include an indication of the start of the downlink data transmission in the first subframe.

In an example, the terminal device can maintain a monitor window in which it continuously monitors the scheduling command (or a replica thereof). The terminal device can use a sliding window to avoid having more than one scheduling command (or a replica thereof) in one monitor window.

In an example, the terminal device can combine the received scheduling command and the replica(s) thereof. In the examples shown in FIGS. 3-6, the terminal device can determine from the indications carried in the replicas of the scheduling commands that these scheduling commands are associated with the same DL data transmission. Then, the terminal device can combine these scheduling commands to achieve a diversity gain. In this way, the robustness of the scheduling command can be improved, thereby achieving low latency and high reliability.

In an example, the terminal device can buffer the downlink data transmission in the first subframe and each of the one or more further subframes. In the example shown in FIG. 6, it is required that the terminal device buffers SF #1, SF #2 and SF #3. In this case, even if the terminal device only receives scheduling command transmitted in SF #3, it can decode the DL data in all of the three subframes.

Figure 8:
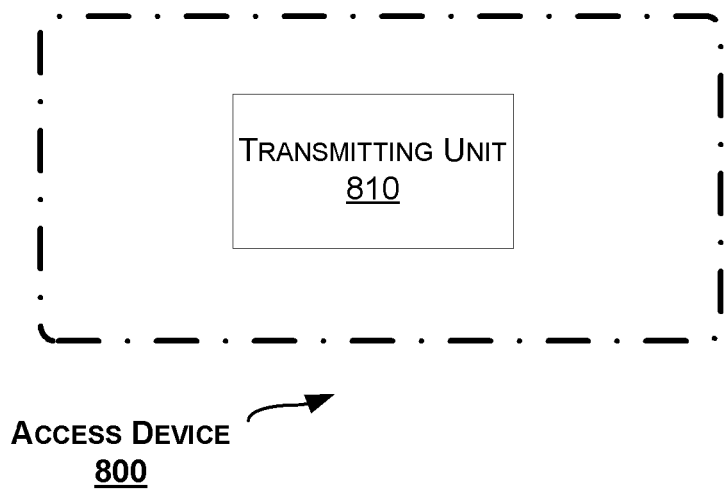
FIG. 8 is a block diagram of an access device according to an embodiment of the present disclosure.

Correspondingly to the method 200 as described above, an access device is provided. FIG. 8 is a block diagram of an access device 800 for transmitting scheduling commands according to an embodiment of the present disclosure.

As shown in FIG. 8, the access device 800 includes a transmitting unit 810. The transmitting unit 810 is configured to transmit a scheduling command for scheduling a downlink data transmission in a first subframe where the downlink data transmission occurs. The transmitting unit 810 is further configured to transmit a replica of the scheduling command in each of one or more further subframes different from the first subframe.

In an example, the transmitting unit 810 can be configured to transmit the replica of the scheduling command in reserved resources and/or resources for downlink data traffic in each of one or more further subframes before the first subframe.

In an example, the replica can include an indication of the first subframe.

In an example, the indication can indicate an offset between the subframe in which the replica is transmitted and the first subframe.

In an example, the transmitting unit 810 can be configured to transmit the scheduling command or the replica of the scheduling command in a numerology having the longest duration and the smallest bandwidth among numerologies in the first subframe or in the further subframe.

In an example, the numerology can be associated with Machine Type Communication (MTC) resources.

In an example, the downlink data transmission can be scheduled semi-persistently and starts in the first subframe. The transmitting unit 810 can be configured to transmit the replica of the scheduling command in each of one or more further subframes subsequent to the first subframe and carrying the semi-persistently scheduled downlink data transmission.

In an example, the replica can include an indication of the start of the downlink data transmission in the first subframe.

In an example, the downlink data transmission can be associated with Ultra-Reliable and Low-Latency Communications (URLLC).

The transmitting unit 810 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 9:
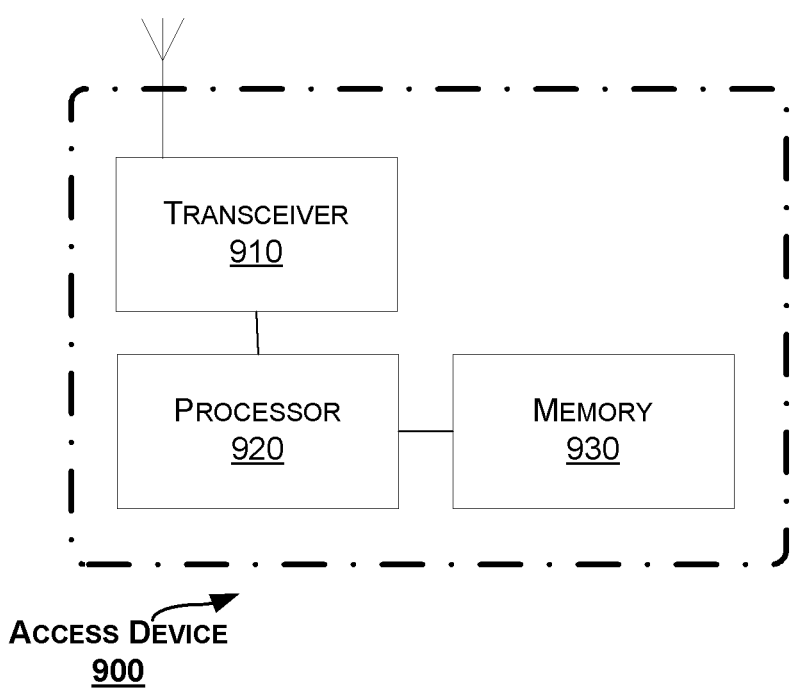
FIG. 9 is a block diagram of an access device according to another embodiment of the present disclosure.

FIG. 9 is a block diagram of an access device 900 according to another embodiment of the present disclosure. The access device 900 can be provided for transmitting scheduling commands.

The access device 900 includes a transceiver 910, a processor 920 and a memory 930. The memory 930 contains instructions executable by the processor 920 whereby the access device 900 is operative to perform the actions, e.g., of the procedure described earlier in conjunction with FIG. 2. Particularly, the memory 930 contains instructions executable by the processor 920 whereby the access device 900 is operative to transmit a scheduling command for scheduling a downlink data transmission in a first subframe where the downlink data transmission occurs; and transmit a replica of the scheduling command in each of one or more further subframes different from the first subframe.

In an example, the operation of transmitting the replica of the scheduling command can include: transmitting the replica of the scheduling command in reserved resources and/or resources for downlink data traffic in each of one or more further subframes before the first subframe.

In an example, the replica can include an indication of the first subframe.

In an example, the indication can indicate an offset between the subframe in which the replica is transmitted and the first subframe.

In an example, the operation of transmitting the scheduling command in the first subframe or transmitting the replica of the scheduling command in each of the one or more further subframes can include: transmitting the scheduling command or the replica of the scheduling command in a numerology having the longest duration and the smallest bandwidth among numerologies in the first subframe or in the further subframe.

In an example, the numerology can be associated with Machine Type Communication (MTC) resources.

In an example, the downlink data transmission can be scheduled semi-persistently and starts in the first subframe, and the operation of transmitting the replica of the scheduling command can include: transmitting the replica of the scheduling command in each of one or more further subframes subsequent to the first subframe and carrying the semi-persistently scheduled downlink data transmission.

In an example, the replica can include an indication of the start of the downlink data transmission in the first subframe.

In an example, the downlink data transmission can be associated with Ultra-Reliable and Low-Latency Communications (URLLC).

Figure 10:
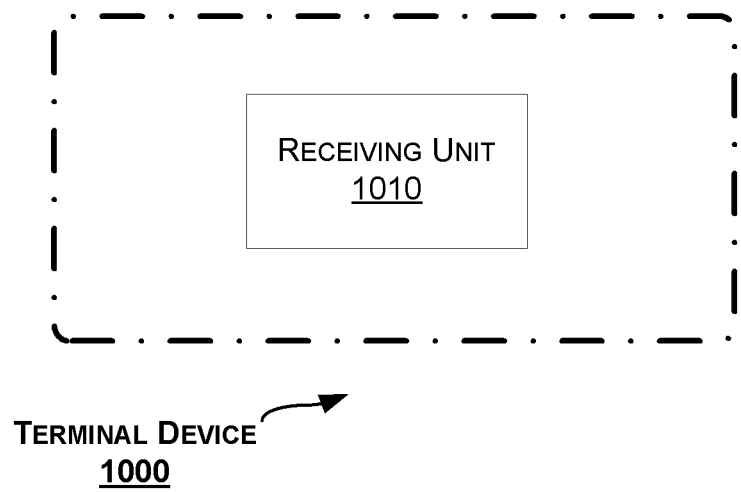
FIG. 10 is a block diagram of a terminal device according to an embodiment of the present disclosure.

Correspondingly to the method 700 as described above, a terminal device is provided. FIG. 10 is a block diagram of a terminal device 1000 for receiving scheduling commands according to an embodiment of the present disclosure.

As shown in FIG. 10, the terminal device 1000 includes a receiving unit 1010. The receiving unit 1010 is configured to receive a scheduling command for scheduling a downlink data transmission in a first subframe where the downlink data transmission occurs. The receiving unit 1010 is further configured to receive a replica of the scheduling command in each of one or more further subframes different from the first subframe.

In an example, the receiving unit 1010 can be configured to receive the replica of the scheduling command in reserved resources and/or resources for downlink data traffic in each of one or more further subframes before the first subframe.

In an example, the replica can include an indication of the first subframe.

In an example, the indication can indicate an offset between the subframe in which the replica is transmitted and the first subframe.

In an example, the receiving unit 1010 can be configured to receive the scheduling command or the replica of the scheduling command in a numerology having the longest duration and the smallest bandwidth among numerologies in the first subframe or in the further subframe.

In an example, the numerology can be associated with Machine Type Communication (MTC) resources.

In an example, the downlink data transmission can be scheduled semi-persistently and starts in the first subframe, and the receiving unit 1010 can be configured to receive the replica of the scheduling command in each of one or more further subframes subsequent to the first subframe and carrying the semi-persistently scheduled downlink data transmission.

In an example, the replica can include an indication of the start of the downlink data transmission in the first subframe.

In an example, the receiving unit 1010 can further be configured to buffer the downlink data transmission in the first subframe and each of the one or more further subframes.

In an example, the receiving unit 1010 can further be configured to maintain a monitor window in which the terminal device continuously monitors the scheduling command or the replica thereof.

In an example, a sliding window can be used as the monitor window to avoid having more than one scheduling command in the monitor window.

In an example, the receiving unit 1010 can further be configured to combine the received scheduling command and the replica(s) thereof.

In an example, the downlink data transmission can be associated with Ultra-Reliable and Low-Latency Communications (URLLC).

The receiving unit 1010 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 11:
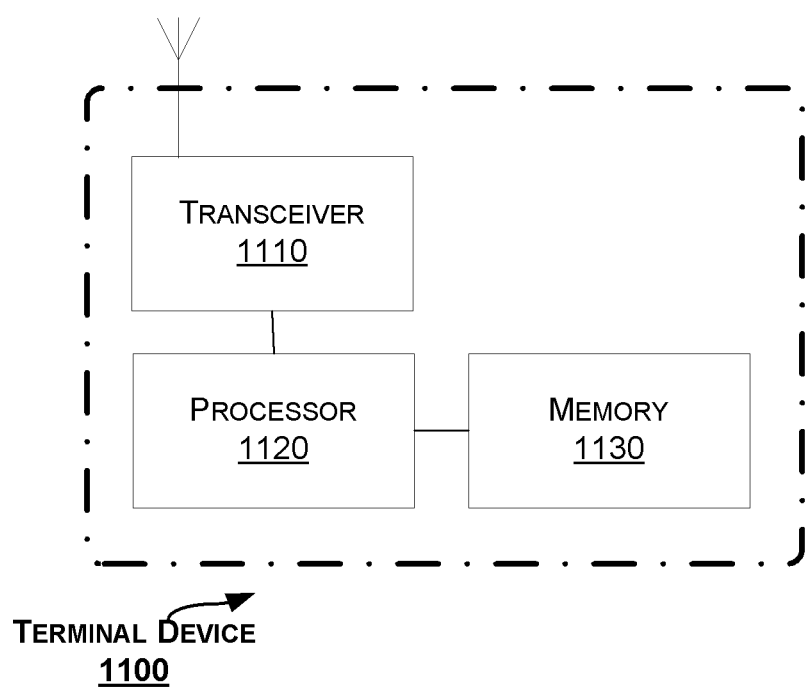
FIG. 11 is a block diagram of a terminal device according to another embodiment of the present disclosure.

FIG. 11 is a block diagram of a terminal device 1100 according to another embodiment of the present disclosure. The terminal device 1100 can be provided for receiving scheduling commands.

The terminal device 1100 includes a transceiver 1110, a processor 1120 and a memory 1130. The memory 1130 contains instructions executable by the processor 1120 whereby the terminal device 1100 is operative to perform the actions, e.g., of the procedure described earlier in conjunction with FIG. 7. Particularly, the memory 1130 contains instructions executable by the processor 1120 whereby the terminal device 1100 is operative to receive a scheduling command for scheduling a downlink data transmission in a first subframe where the downlink data transmission occurs; and receive a replica of the scheduling command in each of one or more further subframes different from the first subframe.

In an example, the operation of receiving the replica of the scheduling command can include: receiving the replica of the scheduling command in reserved resources and/or resources for downlink data traffic in each of one or more further subframes before the first subframe.

In an example, the replica can include an indication of the first subframe.

In an example, the indication can indicate an offset between the subframe in which the replica is transmitted and the first subframe.

In an example, the operation of receiving the scheduling command in the first subframe or receiving the replica of the scheduling command in each of the one or more further subframes can include: receiving the scheduling command or the replica of the scheduling command in a numerology having the longest duration and the smallest bandwidth among numerologies in the first subframe or in the further subframe.

In an example, the numerology can be associated with Machine Type Communication (MTC) resources.

In an example, the downlink data transmission can be scheduled semi-persistently and starts in the first subframe, and the operation of receiving the replica of the scheduling command can include: receiving the replica of the scheduling command in each of one or more further subframes subsequent to the first subframe and carrying the semi-persistently scheduled downlink data transmission.

In an example, the replica can include an indication of the start of the downlink data transmission in the first subframe.

In an example, the memory 1130 can further contain instructions executable by the processor 1120 whereby the terminal device 1100 is operative to buffer the downlink data transmission in the first subframe and each of the one or more further subframes.

In an example, the memory 1130 can further contain instructions executable by the processor 1120 whereby the terminal device 1100 is operative to maintain a monitor window in which the terminal device continuously monitors the scheduling command or the replica thereof.

In an example, a sliding window can be used as the monitor window to avoid having more than one scheduling command in the monitor window.

In an example, the memory 1130 can further contain instructions executable by the processor 1120 whereby the terminal device 1100 is operative to combine the received scheduling command and the replica(s) thereof.

In an example, the downlink data transmission can be associated with Ultra-Reliable and Low-Latency Communications (URLLC).

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the access device 900 to perform the actions, e.g., of the procedure described earlier in conjunction with FIG. 2; or code/computer readable instructions, which when executed by the processor 1120 causes the terminal device 1100 to perform the actions, e.g., of the procedure described earlier in conjunction with FIG. 7.

The computer program product may be configured as a computer program code structured in computer program modules. The computer program modules could essentially perform the actions of the flow illustrated in FIG. 2 or 7.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in an access device for transmitting scheduling commands, comprising:
   transmitting a scheduling command for scheduling a downlink data transmission in a first subframe, wherein the scheduling command indicates where the downlink data transmission occurs; and
   transmitting a replica of the scheduling command in one or more further subframes different from the first subframe even if the one or more further subframes has no resources for downlink data.

2. The method of claim 1, wherein said transmitting the replica of the scheduling command comprises: transmitting the replica of the scheduling command in one or more reserved resources and resources for downlink data traffic in one or more further subframes before the first subframe.

3. The method of claim 1, wherein the replica includes an indication of the first subframe.

4. The method of claim 3, wherein the indication indicates an offset between the subframe in which the replica is transmitted and the first subframe.

5. The method of claim 1, wherein said transmitting the scheduling command in the first subframe or transmitting the replica of the scheduling command in the one or more further subframes comprises: transmitting the scheduling command or the replica of the scheduling command in a numerology having the longest duration and the smallest bandwidth among numerologies in the first subframe or in the further subframe.

6. The method of claim 5, wherein the numerology is associated with Machine Type Communication, MTC, resources.

7. The method of claim 1, wherein the downlink data transmission is scheduled semi-persistently and starts in the first subframe, and said transmitting the replica of the scheduling command comprises: transmitting the replica of the scheduling command in one or more further subframes subsequent to the first subframe and carrying the semi-persistently scheduled downlink data transmission.

8. The method of claim 7, wherein the replica includes an indication of the start of the downlink data transmission in the first subframe.

9. An access device comprising a transceiver, a processor and a memory, the memory comprising instructions executable by the processor whereby the access device is operative to perform the method according to claim 1.

10. A method in a terminal device for receiving scheduling commands, comprising:
 receiving a scheduling command for scheduling a downlink data transmission in a first subframe, wherein the scheduling command indicates where the downlink data transmission occurs; and
 receiving a replica of the scheduling command in one or more further subframes different from the first subframe even if the one or more further subframes has no resources for downlink data.

11. The method of claim 10, wherein said receiving the replica of the scheduling command comprises: receiving the replica of the scheduling command in one or more reserved resources and resources for downlink data traffic in one or more further subframes before the first subframe.

12. The method of claim 10, wherein the replica includes an indication of the first subframe.

13. The method of claim 12, wherein the indication indicates an offset between the subframe in which the replica is transmitted and the first subframe.

14. The method of claim 10, wherein said receiving the scheduling command in the first subframe or receiving the replica of the scheduling command in the one or more further subframes comprises: receiving the scheduling command or the replica of the scheduling command in a numerology having the longest duration and the smallest bandwidth among numerologies in the first subframe or in the further subframe.

15. The method of claim 10, wherein the downlink data transmission is scheduled semi-persistently and starts in the first subframe, and said receiving the replica of the scheduling command comprises: receiving the replica of the scheduling command in one or more further subframes subsequent to the first subframe and carrying the semi-persistently scheduled downlink data transmission.

16. The method of claim 15, wherein the replica includes an indication of the start of the downlink data transmission in the first subframe.

17. The method of claim 15, further comprising:
 buffering the downlink data transmission in the first subframe and the one or more further subframes.

18. The method of claim 10, further comprising:
 maintaining a monitor window in which the terminal device continuously monitors the scheduling command or the replica thereof.

19. The method of claim 18, wherein a sliding window is used as the monitor window to avoid having more than one scheduling command in the monitor window.

20. The method of claim 10, further comprising:
 combining the received scheduling command and the replica(s) thereof.

* * * * *